(12) United States Patent
Choyi et al.

(10) Patent No.: US 11,968,315 B2
(45) Date of Patent: *Apr. 23, 2024

(54) SYSTEM AND METHOD FOR ESTABLISHING DYNAMIC TRUST CREDENTIALS FOR NETWORK FUNCTIONS

(71) Applicant: Verizon Patent and Licensing Inc., Basking Ridge, NJ (US)

(72) Inventors: Vinod Kumar Choyi, Conshohocken, PA (US); Sudhakar Reddy Patil, Flower Mound, TX (US); Jayesh Kumar Laad, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,899

(22) Filed: Nov. 9, 2022

(65) Prior Publication Data

US 2023/0064698 A1    Mar. 2, 2023

Related U.S. Application Data

(63) Continuation of application No. 16/842,060, filed on Apr. 7, 2020, now Pat. No. 11,522,721.

(51) Int. Cl.
*H04L 29/06* (2006.01)
*G06F 9/455* (2018.01)
(Continued)

(52) U.S. Cl.
CPC ............ *H04L 9/3268* (2013.01); *G06F 9/455* (2013.01); *G06F 21/44* (2013.01); *H04L 9/006* (2013.01); *H04L 9/3236* (2013.01)

(58) Field of Classification Search
CPC ..... H04L 9/3268; H04L 9/006; H04L 9/3236; H04L 9/0643; H04L 9/3247;
(Continued)

(56) References Cited

U.S. PATENT DOCUMENTS

| 9,331,990 B2 * | 5/2016 | Le Saint | ............... H04L 9/3263 |
| 2016/0127353 A1 * | 5/2016 | Thomas | ................. H04L 9/006 |
| | | | 713/156 |

(Continued)

OTHER PUBLICATIONS

"Russ Housley, RFC3280: Internet X. 509 public key infrastructure certificate and certificate revocation list (CRL) profile, 2002, Network Working Group, pp. 1-129" (Year: 2002).*

*Primary Examiner* — Jorge L Ortiz Criado
*Assistant Examiner* — Kevin Ayala

(57) ABSTRACT

Systems and methods leverage trust anchors to generate tokens which can then be used by network functions (NFs). A virtualization infrastructure manager (VIM) for a virtualized platform receives a NF software package and a certificate request token (CRT) from a management function. The NF is a virtual NF, a containerized NF, or another virtual entity (xNF) to be deployed. The CRT is digitally signed by the management function and includes a network address of a trust anchor platform and a NF profile. The VIM deploys the NF and provides the CRT to the NF. The NF obtains from the CRT the network address of the trust anchor platform, generates a certificate signing request (CSR) for a digital certificate, and submits the CSR and the CRT to the trust anchor platform. The NF receives a digital certificate from the trust anchor platform based on validation of both the CSR and CRT.

20 Claims, 8 Drawing Sheets

(51) Int. Cl.
 *G06F 21/44* (2013.01)
 *H04L 9/00* (2022.01)
 *H04L 9/32* (2006.01)

(58) Field of Classification Search
 CPC . H04L 63/0807; H04L 63/0823; G06F 9/455; G06F 21/44
 See application file for complete search history.

(56) References Cited

U.S. PATENT DOCUMENTS

| | | | |
|---|---|---|---|
| 2016/0330164 A1* | 11/2016 | Bellan | H04L 63/0823 |
| 2016/0337329 A1* | 11/2016 | Sood | H04L 63/06 |
| 2017/0012968 A1* | 1/2017 | Feng | G06F 8/63 |
| 2017/0054710 A1* | 2/2017 | Xiong | H04L 9/3268 |
| 2018/0227182 A1 | 8/2018 | Patton et al. | |
| 2019/0253264 A1* | 8/2019 | Singaravelu | H04L 9/0877 |
| 2021/0028923 A1* | 1/2021 | Ryou | H04L 9/3239 |
| 2022/0052992 A1* | 2/2022 | Zhang | H04L 9/3213 |

* cited by examiner

SYSTEM AND METHOD FOR ESTABLISHING DYNAMIC TRUST CREDENTIALS FOR NETWORK FUNCTIONS

CROSS-REFERENCE TO RELATED APPLICATION

This application is a continuation of U.S. patent application Ser. No. 16/842,060, filed on Apr. 7, 2020, and titled "System and Method for Establishing Dynamic Trust Credentials for Network Functions," the contents of which are incorporated herein by reference.

BACKGROUND

A digital certificate or public key certificate is an electronic document used to prove the ownership of a public key. Public key infrastructure (PKI) standards, such as International Telecommunication Union (ITU) Telecommunication Standardization Sector X.509 (referred to herein as "X.509") define a format of digital certificates. In Fifth Generation (5G) core networks, for example, an X.509 certificate (or more particularly an X.509v3 certificate) provides a Network Function (NF) with the ability to provide assurance of its identity to other NFs; Operations, Administration and Management (OA&M) functions; and other functions that provide important services (e.g., Network Repository Functions (NRFs)).

DETAILED DESCRIPTION OF EXAMPLE EMBODIMENTS

Figure 1:
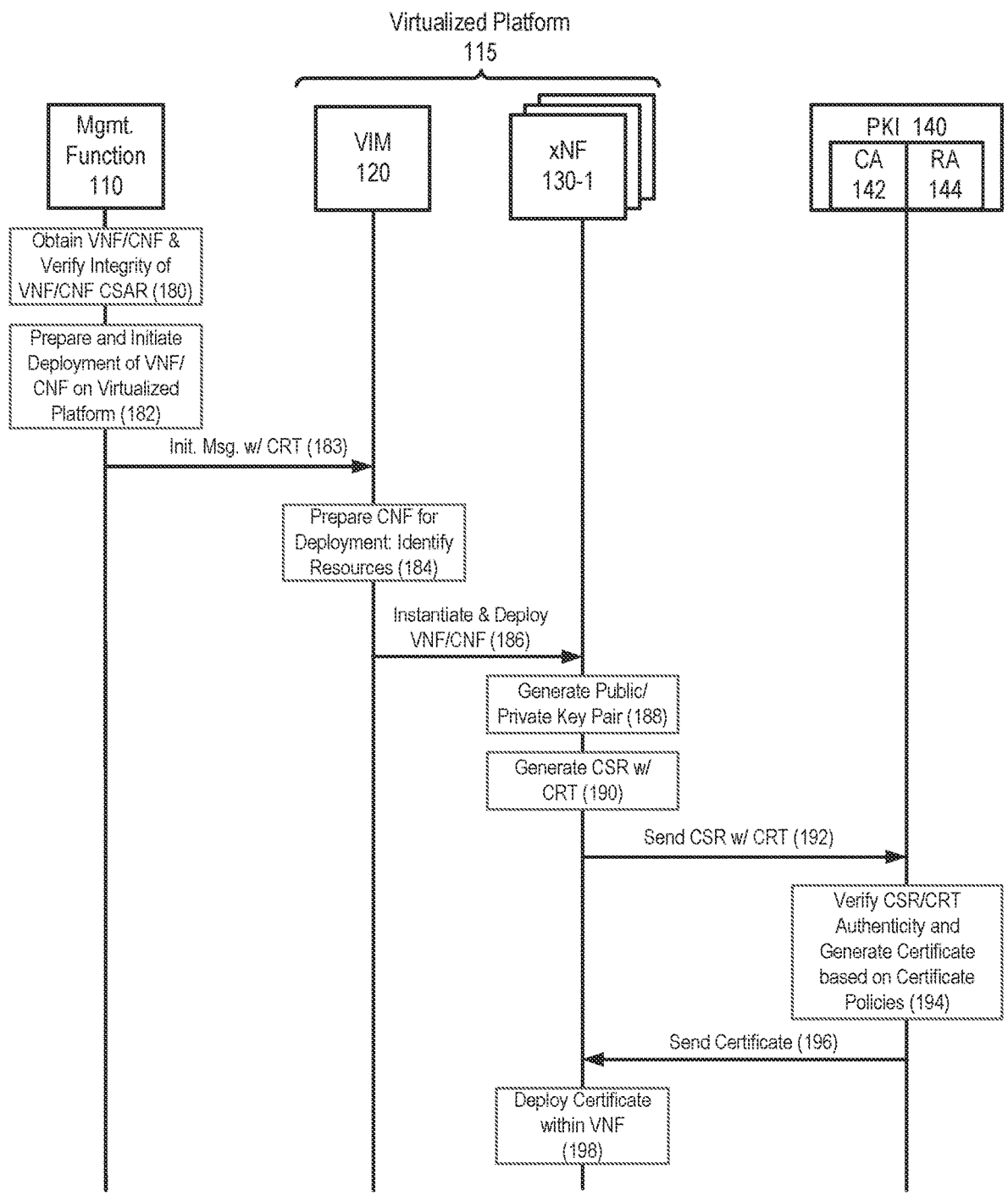
FIG. 1 is a diagram illustrating a communications in a network environment in which systems and methods described herein may be implemented.

The following detailed description refers to the accompanying drawings. The same reference numbers in different drawings identify the same or similar elements.

A digital certificate, such as an X.509v3 certificate, is an important component of building trust within 5G networks and other networks that use virtualized platforms. Possession of an X.509v3 certificate provides the ability for a network function (NF) to request services and information from other NFs.

A typical network environment may include an orchestrator or management function that directs use of resources in a virtualized platform. The virtualized platform may use a virtualization infrastructure manager (VIM) to deploy requested network functions, such as containerized network functions (CNFs), virtual network functions (VNFs), or another virtual entity. A VNF, CNF or other virtual entity may be referred to generically and collectively herein as an "xNF." As part of the initialization process an xNF typically obtains a digital certificate (e.g., an X.509v3 certificate) from a public key infrastructure (PKI) system to provide assurance of the xNF's identity in subsequent transactions. However, weaknesses of the current X.509v3 certificate provisioning process can be exposed at the xNF level, at the PKI level, or at the VIM level.

For example, a misbehaving xNF (e.g., malicious or non-malicious via configuration) may be able to impersonate a known xNF in order to request x.509v3 certification requisition services. Such capability may be adapted to perform denial-of-service attacks against the core network, or may be misused to degrade services and expose of subscribers' private information. When an xNF requests a X.509v3 certificate there is currently no mechanism for a PKI system to properly verify that the xNF requesting the certificate has been authorized to be provisioned with a certificate that matches the functionality associated with the xNF, since the xNF can easily spoof an identity (e.g., using a fully qualified domain name (FQDN) attack or the like).

Furthermore under the current X.509v3 certificate process, even if PKI system can verify that a certificate is issued to an authorized xNF, the PKI system is not able to tailor the X.509v3 certificate to the unique characteristics of the NF. For example, the PKI system is not provided with administrative information or attributes of the deployed xNF to properly limit the scope of the X.509v3 certificate. Thus, an xNF may be granted an X.509v3 certificate for an improper duration, key usage, etc.

Also in the current X.509v3 certificate process, after the VIM receives a xNF software package from the management function, and after verifying the authenticity of the xNF, the VIM deploys the xNF and makes it operational. A misbehaving VIM may deploy the wrong xNF or an xNF with out-of-date code (e.g., an obsolete version of machine or binary code). Based on a request from the xNF, the PKI system may then issue an X.509v3 certificate to the wrong xNF, thus rendering the network potentially vulnerable to attacks.

Systems and methods described herein leverage trust anchors to generate tokens which can then be used by network functions for providing services. In certain cryptographic systems, a trust anchor may be considered an authoritative entity for which trust is assumed and not derived. In an X.509 architecture, a root certificate may be the trust anchor from which a chain of trust is derived. As described further herein, the management function generates a token (referred to herein as a certificate request token or CRT) that is used for certificate request with the PKI system by the xNF. The CRT is included as part of a certificate signing request (CSR) message. In some implementations, the management function 110 may include a certificate attribute list (CAL) with the CRT, where the CAL can be used to customize certificates for each xNF. In some aspects, a management function such as an orchestration function may be absent. In such cases, the virtualized platform may generate the CRT on behalf of the management function based on configuration parameters and optionally triggered by an administrator requesting a certificate on behalf of the xNF.

In still another implementation, the management function may generate a CRT that is used by the virtualized platform for deployment of the xNF on the platform. Additionally, a trusted attestation engine associated with the virtualized platform then provides "proof-of-image-integrity" by sending a platform characteristics token (PCT) which is used by the PKI to tailor the certificate to a particular platform.

As described further herein, the systems and methods described herein use a CRT generated by the management function to ensure a high level of confidence that an xNF identity within a digital certificate is accurate, and therefore more trustworthy, which mitigates potential impersonation attacks. Also, a digital certificate that is issued after CRT validation can be assured to have the right set of parameters and therefore can be used to limit the scope and potential misuse of the certificate by an xNF. Furthermore, the systems and methods described herein prevent a misbehaving VIM from requesting false certificates.

FIG. 1 is a diagram of an exemplary environment 100 in which the systems and/or methods, described herein, may be implemented. FIG. 1 may represent network elements in a 5G network or another network in which third-party network functions can benefit from trust anchors. In the example of FIG. 1, network environment 100 may include a management function 110 that has the capability to orchestrate and direct deployment of resources in a virtualized platform 115 that includes a virtualization infrastructure manager (VIM) 120 and a plurality of xNFs 130. As described further herein, an X.509v3 certificate for a newly-deployed NF may be issued by a PKI system 140.

Management function 110 may include an orchestrator or other type of control device for virtualized platform 115. Management function 110 may include, for example, a network function virtualization orchestrator (NFVO), a multi-access edge computing (MEC) orchestrator, and/or another type of network device. According to an implementation, management function 110 may be included with a core network, such as a 3GPP Fifth Generation (5G) wireless core network or 3GPP Fourth Generation (4G) Long Term Evolution (LTE) core network.

Virtualized platform 115 may include a network that provides virtual network functions. Virtualized platform 115 may be implemented using one or multiple technologies including, for example, network function virtualization (NFV), software defined networking (SDN), cloud computing, or another type of network technology. Virtualized platform 115 may include hardware, such as physical memory and processing components, of a network element, that can be configured to spin-up or tear-down a virtual entity. According to an implementation, virtualized platform 115 may include a VIM 120 and host a plurality of xNFs 130.

VIM 120 may include a network device that controls and manages compute, storage, and network resources of virtualized platform 115. Among other functions, VIM 120 may, upon direction from management function 110, prepare and initiate deployment of a CNF to support a requested VNF. xNF 130 may include a CNF and/or VNF to support a particular application service.

PKI system 140 includes one or more network devices that, in conjunction with certificate authority 142, bind xNF public keys with respective xNF identities and assist in the creation, management, distribution, storage and revocation of digital certificates. Certificate authority (CA) 142 includes one or more network devices that act as a node in a PKI system 140 for generating and issuing a digital certificate requested by an xNF 130. Registration authority (RA) 144 includes one or more network devices that verifies the identity of xNFs. According to one implementation, PKI system 140 may be included within a service provider's core network (e.g., a 5G core network). In other implementations, PKI system 140 may be external to the service provider's network.

As shown in FIG. 1, management function 110, at reference 180, may obtain program code (e.g., a software package) for an xNF. For example, management function 110 may receive a VNF package from a vendor or purchase a VNF package through a virtual marketplace. The VNF package may include a cloud services archive (CSAR). The CSAR provides a template of the network service and the scripts the VNF needs for its lifecycle. Management function 110 may verify the integrity and authenticity of the CSAR and/or VNF package using digital signatures.

Assuming management function 110 validates the integrity of the CSAR, at reference 182, management function 110 may prepare and initiate deployment of the xNF on virtualized platform 115. More particularly, management function 110 may send an initialization message to VIM 120. As shown at reference 183, the instantiation message may include a Certificate Request Token (CRT). As described further herein, the CRT may eventually be used by an xNF 130 in requesting digital certificate (e.g., an X.509v3 certificate) from PKI system 140.

VIM 120 may receive the instantiation message and, as shown at reference 186, may begin to prepare a CNF for deployment by identifying resources within virtualized platform 115 that can support the requested service. Based on the identified resources, as shown at reference 188, VIM 120 may instantiate and deploy the requested CNF/VNF at xNF 130-1. Once deployed, xNF 130-1 may generate a public/private key pair, as indicated at reference 188, and generate a certificate signing request (CSR) 190 to request an X.509v3 certificate. According to implementations described herein, CSR 190 may include the CRT that originated with management function 110 (e.g., at reference 182). According to an implementation, the CRT may be included as part of the input to generate the CSR, such that the CRT is tightly bound to the CSR. According to another implementation, the CRT may also include a CAL (not shown in FIG. 1).

XNF-1 130 may send the CSR with CRT to PKI system 140, as indicated at reference 192. PKI system 140 (also referred to as a "trust anchor platform") may receive the CSR with CRT. As shown at reference 194, PKI system 140 may verify the CSR authenticity and the CRT authenticity. Assuming both the CSR and CRT are determined to be valid, PKI system 140 may generate a certificate (e.g., an X.509v3 certificate) based on the public key in the CSR and the policies in the CRT. PKI system 140 may send the certificate 196 to xNF 130-1. XNF-1 130 may receive the certificate and deploy the certificate within the virtual network function, as indicated by reference 198.

Although FIG. 1 show exemplary communications in network environment 100, in other implementations, network environment 100 may include additional components, different components, additional components, or differently arranged components than depicted in FIG. 1.

Figure 2:
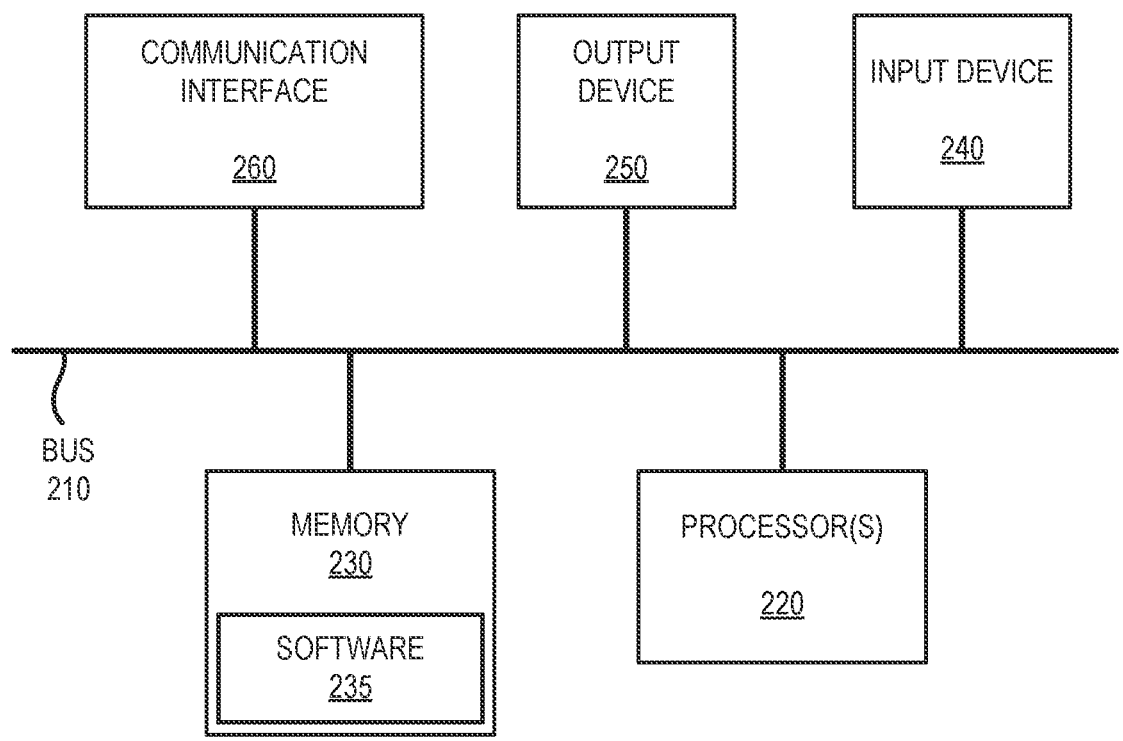
FIG. 2 is a diagram illustrating exemplary components of a device that may be included in a component of FIG. 1, according to an implementation described herein.

FIG. 2 is a diagram illustrating example components of a device 200 according to an implementation described herein. Management function 110, VIM 120, xNF 130, PKI system 140, and/or other components of network environment 100 may be implemented by one or more devices 200.

Device 200 may include a bus 210, one or more processors 220, a memory 230 with software 235, an input component 240, an output component 250, and a communication interface 260. Although FIG. 2 shows exemplary components of device 200, in other implementations, device 200 may contain fewer components, additional components, different components, or differently arranged components than those depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or be used to create processes. Software 235 is also intended to include firmware, middleware, microcode, hardware description language (HDL), and/or other form of instruction. By way of example, with respect to xNF 130, each xNF 130 may be implemented to include software 235 for a particular application or function.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. For example, communication interface 260 may include one or more antennas to transmit and/or receive RF signals over the air. Communication interface 260 may, for example, receive RF signals and transmit them over the air to UE 110, and receive RF signals over the air from UE 110. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. As another example, device 200 may include one or more switch fabrics instead of, or in addition to, bus 210. Additionally, or alternatively, one or more components of device 200 may perform one or more tasks described as being performed by one or more other components of device 200.

Figure 3A:
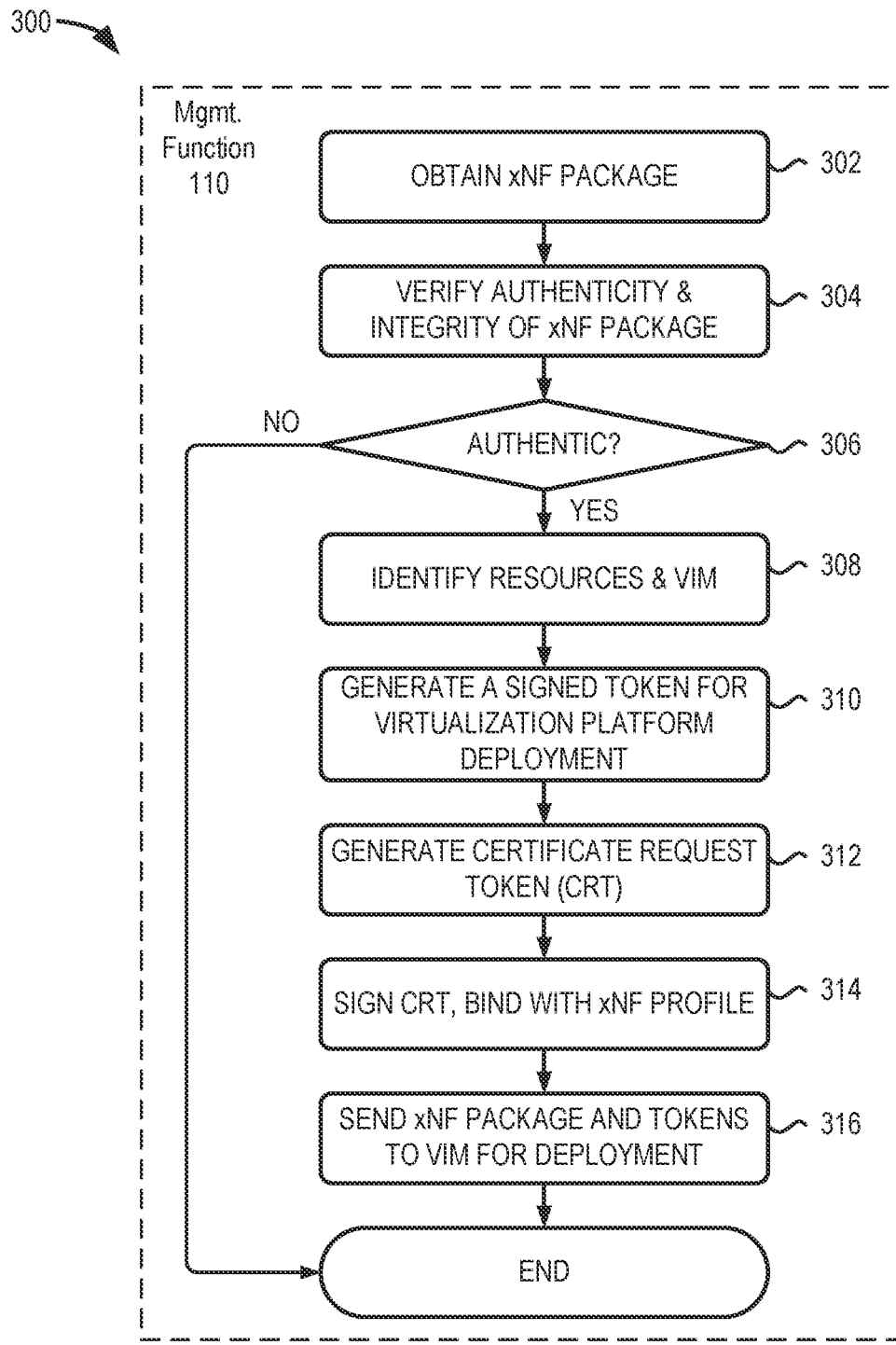
FIGS. 3A-3C is a flow diagram for a process of leveraging trust anchors to generate tokens which can then be used by the various stakeholders for providing services.
Figure 3B:
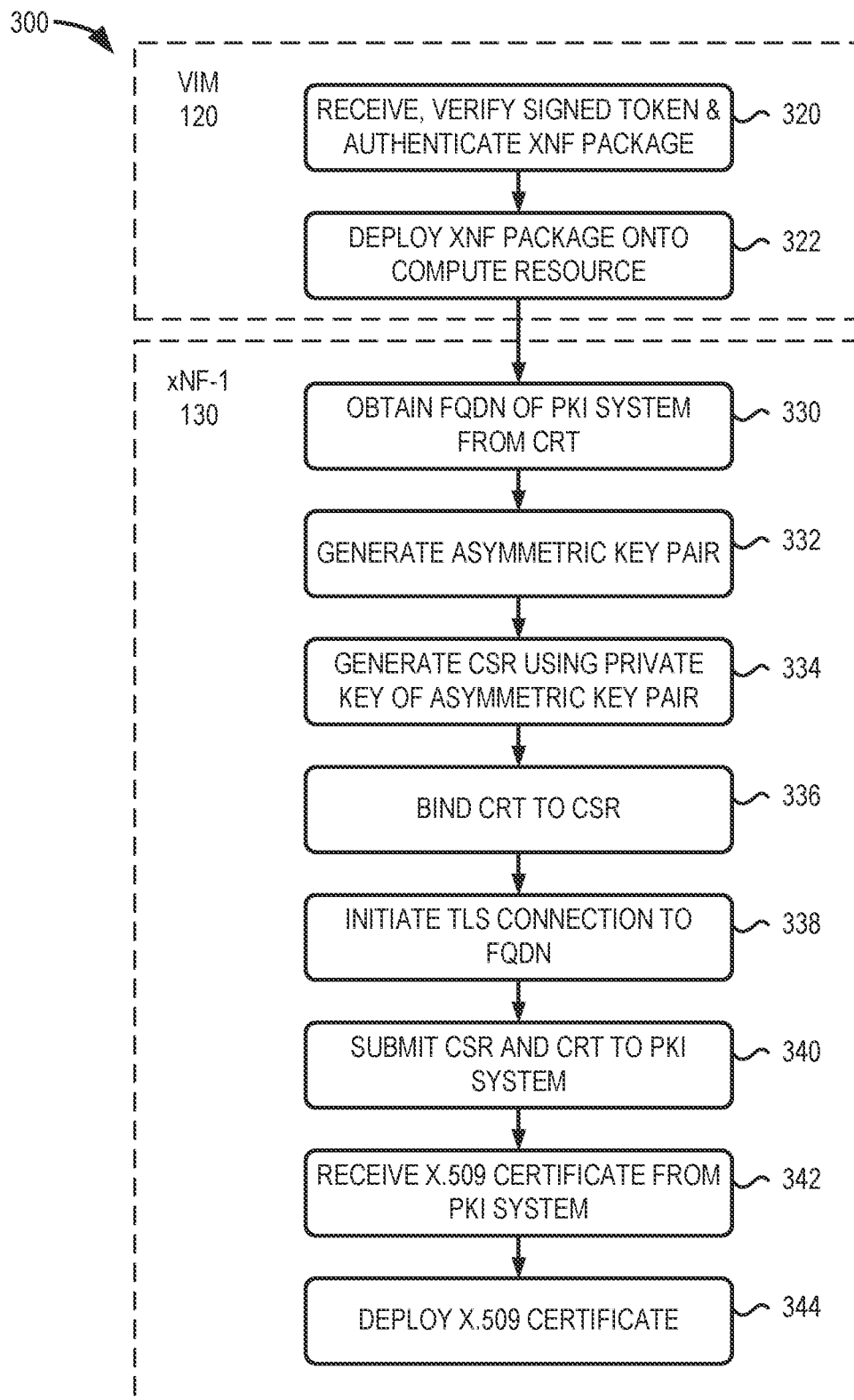
Figure 3C:
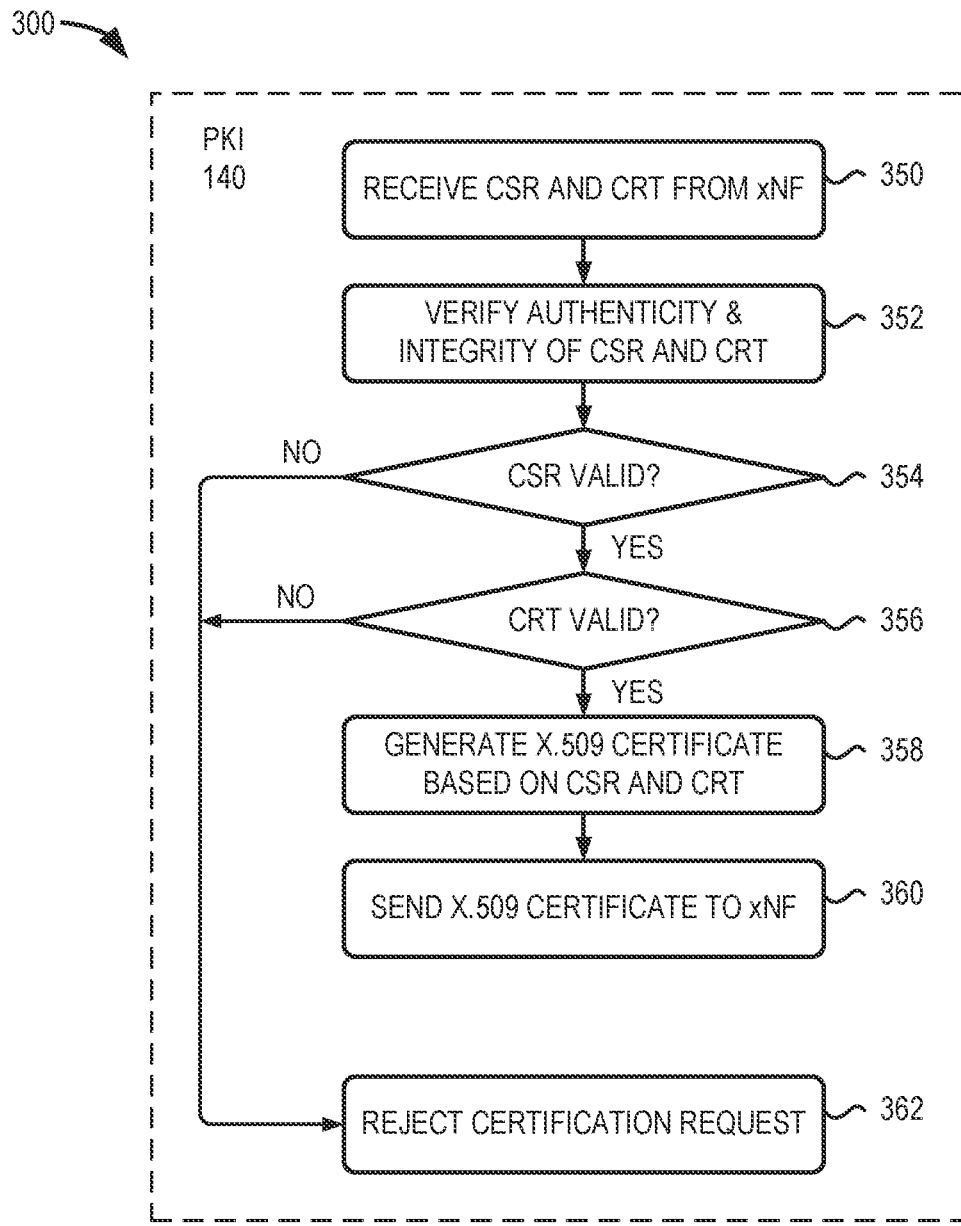

FIGS. 3A-3C are a flow diagram for a process of leveraging trust anchors to generate tokens which can then be used by the various stakeholders for providing services. For example, process 300 may be used to provision xNF 130-1 with a certificate to enable cryptographic exchanges between different xNFs 130.

Process blocks in FIG. 3A, may be performed, for example, by management function 110. As shown in FIG. 3A, process 300 may include obtaining an xNF package (block 302), and verifying the authenticity and integrity of the xNF package (block 304). An xNF package may include, for example, a software package, a firmware package, or combination of software and firmware. The xNF package may include an xNF profile and metadata associated with an xNF (e.g., xNF 130-1). For example, management function 110 may download a VNF package or a CNF package that a service provider intends to implement in a cloud platform (e.g., virtualized platform 115). The xNF package may be received, for example, from a marketplace or a vendor platform. Management function 110 may verify the authenticity and integrity of the xNF package by means of digital signature. For example, if the xNF package is labeled as a charging function for "Vendor A," management function 110 may confirm the origin of the charging function (e.g., as being from "Vendor A") and the content (e.g., providing a charging function).

If the xNF is not authentic (block 306—No), management function 110 may reject the xNF package and process 300 may end. If the xNF is authentic (block 306—Yes), process 300 may include identifying resources and a VIM for the xNF (block 308), generating a cryptographic signed token that is used for virtualization deployment (block 310), and generating a CRT (block 312). For example, management function 110 may identify in virtualization platform 115 computing resources that can support the new xNF package and select a VIM (e.g., VIM 120) to deploy the new function. Management function 110 may generate a signed token for VIM 120 to use to verify deployment instructions and authenticity of the new xNF package. Management function 110 may also generate a CRT. As described further herein, the CRT may not be verified by VIM 120, but is eventually used by PKI system 140 to verify the xNF (e.g., xNF 130-1). According to an implementation, management function may also generate a CAL that is provided within or separate from the CRT.

Process 300 may also include signing the CRT and binding the CRT with an xNF profile (block 314), and sending an xNF package and tokens to the VIM for deployment (block 316). For example, management function 110 may digitally sign the CRT and bind the CRT to an xNF profile. The xNF profile may include the description and configuration requirements for xNF 130-1. The xNF profile may provide information and meta-data that describes the types of services and micro-services provided by it. An example of such profile is defined by 3GPP as a "NF profile" that can be registered with a Network Resource Function (NRF). The management function 110 may forward the xNF package, the tokens, and the xNF profile (with the CRT) to VIM 120 for deployment.

Process blocks in FIG. 3B, may be performed, for example, by devices in virtualization platform 115. More particularly, VIM 120 may perform process blocks 320 and 322, while xNF 130-1 may perform the remaining process blocks of process 300. Referring to FIG. 3B, process 300 may include receiving and verifying the signed token and authenticity of the xNF package (block 320) and deploying the xNF package onto compute resources (block 322). For example, VIM 120 may receive the xNF package from management function 110 (e.g., sent in process block 316). VIM 120 may verify the integrity and authenticity of the signed access token from management function 110. It is assumed that the VIM 120 is provided access to the certificate associated with the management function 110 and also assumed that the VIM 120 and the management function 110 share the same trust anchor. Assuming the signed token has been validated and verified, VIM 120 may deploy the xNF package onto compute resources in virtualization platform 115. More particularly, VIM 120 may provide instructions, including the CRT, to deploy the xNF package to create xNF 130-1.

Process 300 may further include receiving deployment instructions and obtaining a network address of the PKI system from the CRT (block 330), generating an asymmetric key pair (block 332), and generating a CSR using the asymmetric key pair (block 334). For example, xNF 130-1 may use the audience address field (e.g., FIG. 4, 404) of the CRT to obtain a FQDN of PKI system 140. XNF-1 130 may generate a public/private key pair and generate a CSR 190 using the private key of the asymmetric key pair.

Process 300 may further include binding the CRT to the CSR (block 336), initiating a Transport Layer Security (TLS) connection to the FQDN (block 338), and submitting the CSR with CRT to the PKI system (block 340). For example, xNF 130-1 may, optionally, bind the CRT (e.g., received via VIM 120) to the CSR generated in process block 334. XNF-1 130 may conduct a TLS handshake to initiate a TLS connection using the FQDN associated with PKI system 140 (e.g., in the audience address field of the CRT). Using the established TLS connection, xNF 130-1 may send the CSR and CRT to PKI system 140.

As described with reference to FIG. 3C below, PKI system 140 may receive the CST and CRT, process the CSR, and issue a certificate (e.g., X.509 certificate) to xNF 130-1. Referring again to FIG. 3B, process 300 may include receiving an X.509 certificate from the PKI system (block 342) and deploying the X.509 certificate (block 344). For example, xNF 130-1 may receive an X.509 certificate from PKI system 140. The X.509 certificate may be based on the public key from the CSR and parameters provided in the CRT. Because of information in the CRT, the certificate that is issued has the right set of parameters and, therefore, can be used to define scope and limit potential misuse of the certificate by xNF 130-1.

Process blocks in FIG. 3C, may be performed, for example, by devices in PKI system 140. Referring to FIG. 3C, process 300 may include receiving a CSR and CRT from the xNF (block 350), and verifying the authenticity and integrity of the CSR and CRT (block 352). For example, PKI system 140 may receive a CSR and CRT from xNF 130-1 via the TLS connection established in block 338. As described above, xNF 130-1 may have bound the CRT to the CSR. Using the public key of the asymmetric key pair, PKI system 140 verifies the CSR and the CRT before generating a X.509 certificate.

If the CSR is not valid (block 354—No), or if the CRT is not valid (block 356—No), process 300 may include rejecting the certification request (block 362). The CRT may be validated by verifying the digital signature provided by the management function 110 using the digital certificate associated with the management function 110. For example, if either of the CSR or CRT cannot be validated, PKI system 140 may not provide a certificate in response to the CSR from xNF 130-1.

If the CSR is valid (block 354—Yes) and if the CRT is valid (block 356—Yes), process 300 may include generating the X.509 certificate (block 360) and sending the X.509 certificate to the xNF (block 360). For example, PKI system 140 may verify the CSR authenticity and the CRT authenticity. Assuming both the CSR and CRT are determined to be valid, PKI system 140 may generate a certificate (e.g., an X.509v3 certificate) based on the public key in the CSR and the policies in the CRT. PKI system 140 may send the certificate to xNF 130-1 using, for example, the TLS connection established in block 338 described above.

Figure 4:
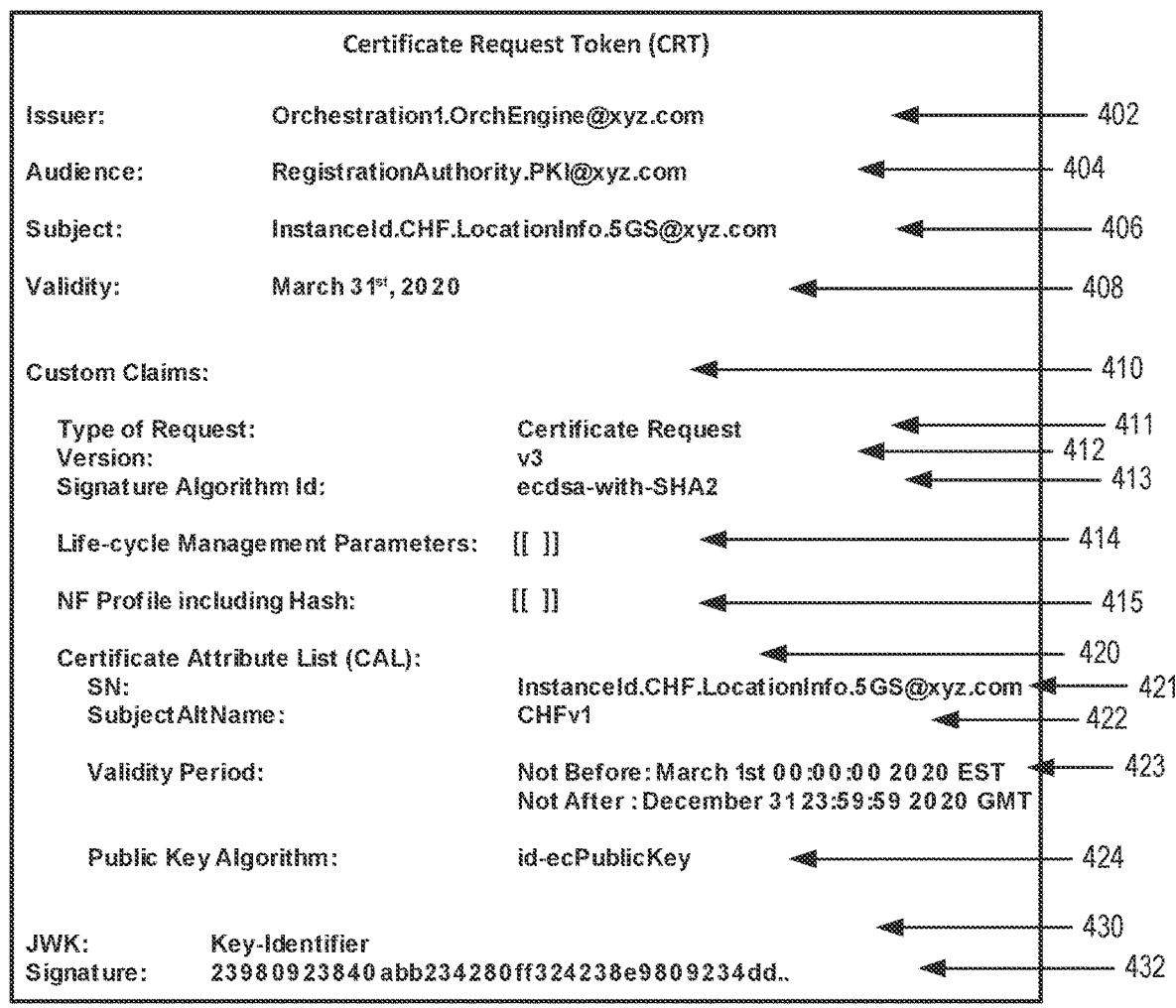
FIG. 4 is a diagram of an exemplary Certificate Request Token (CRT) according to an implementation.

FIG. 4 is a diagram of an exemplary CRT 400 according to an implementation. CRT may be generated, for example, by management function 110 and used by PKI system 140 to authenticate an xNF.

As shown in FIG. 4, CRT 400 may include an issuer field 402, an audience field 404, a subject field 406, a validity field 408, a custom claims section 410, a key identifier field 430, and a signature field 432.

Issuer field 402 may include a network address (e.g., a FQDN) of the management function 110 that generates CRT 400 (e.g., "Orchestration1.OrchEngine@xyz.com"). Audience field 404 may include a network address (e.g., a FQDN) of PKI system 140, the PKI system designated to act on a CSR from an xNF (e.g., "RegistrationAuthority.PKI@xyz.com"). Subject field 406 may include an identifier for the xNF package to be instantiated (e.g., a FQDN of the form: "InstanceIDCHF.LocationInfo.5G@xyz.com"). Validity field 408 may include a deadline date or time period for which CRT 400 is valid (e.g., "Mar. 31, 2020").

Custom claims section 410 may include custom information particular to rights granted to an xNF 130. For example, custom claims section 410 may include a type of request field 411 that indicates a type of request associated with the CRT (e.g., "Certificate Request"), a version field 412 that indicates a version of the type of request (e.g., "v3"), a signature algorithm field 413 that identifies the type of algorithm used for signature field 432 (e.g., "ecdsa-with-SHA2"), life-cycle management parameters field 414 that lists one or more parameters that provides duration or limit for the certificate, usage of the certificate (e.g. client authentication, server authentication, digital signature or a combination of the above), renewal of the certificate (e.g. how often), update of the certificate, and a NF profile including hash field 415.

Entries for field 415 may be generated by hashing an xNF profile. "Hashing," as referred to herein, may include the process of translating or mapping a string of bits of any length into another string of a fixed length, based on a mathematical algorithm or a function (herein referred to as a "hash function" or "cryptographic hash function"). As an example, the hashing algorithm SHA-256 may be used as one of the cryptographic algorithms. For example, as described below, management function 110 may apply an SHA-256 hash function to the xNF profile or to the xNF package to generate a hash value for field 415 of CRT 400. PKI system 140 or a trusted measuring application (TMA)

may separately apply the same hashing algorithm to data received from an xNF 130 to validate the xNF profile or the xNF package respectively.

According to an implementation, CRT 400 may also include a CAL 420 in custom claims section 410. CAL 420 may include information to customize a certificate for xNF 130-1. More particularly, parameters in CAL 420 (e.g., as generated by management function 110) may supplement and/or supersede CSR policies (e.g., as generated by an xNF 130) to create an X.509 certificate. For example, CAL 420 may provide a subset of attributes (e.g., a subject name that includes a FQDN or other identity, a Public Key Algorithm, a Validity Period, a Signature Algorithm identifier, etc.), that can be used by PKI system 140 to generate a digital certificate with parameters overruling, if necessary, those listed in a CSR that might be generated by a misbehaving xNF 130.

In the example of FIG. 4, CAL 420 may include a subject name field 421, a subject alternate name field 422, a validity period field 423, and a public key algorithm field 424. Subject name field 421 may include an identifier for the particular xNF (e.g., xNF 130-1) to be instantiated (e.g., "InstanceIDCHF.LocationInfo.5G@xyz.com"), where the subject name in field 421 may be the same as or may supersede the subject name in field 406. Subject alternate name field 422 may include an alternate name (e.g., "CHFv1", e.g., a UUID associated with the xNF, the type or class of network function—NF-type) for the particular xNF. Validity period field 423 may include a time period (e.g., a start and end date) that a digital certificate will be valid. Public key algorithm field 424 may include the algorithm identifier of the algorithm used for encryption (e.g., "id-ec Public Key").

Key identifier field 430 may include an ID for the private key to be used exchanges. Signature field 432 may include the digital signature of the issuer. For example, management function 110 may use a private key to digitally sign CRT 400.

Although FIG. 4 illustrates exemplary fields for CRT 400, in other implementations CRT 400 may include fewer, different, or additional fields than depicted in FIG. 4. For example, CRT 400 may not include CAL 420 in some implementations.

Figure 5:
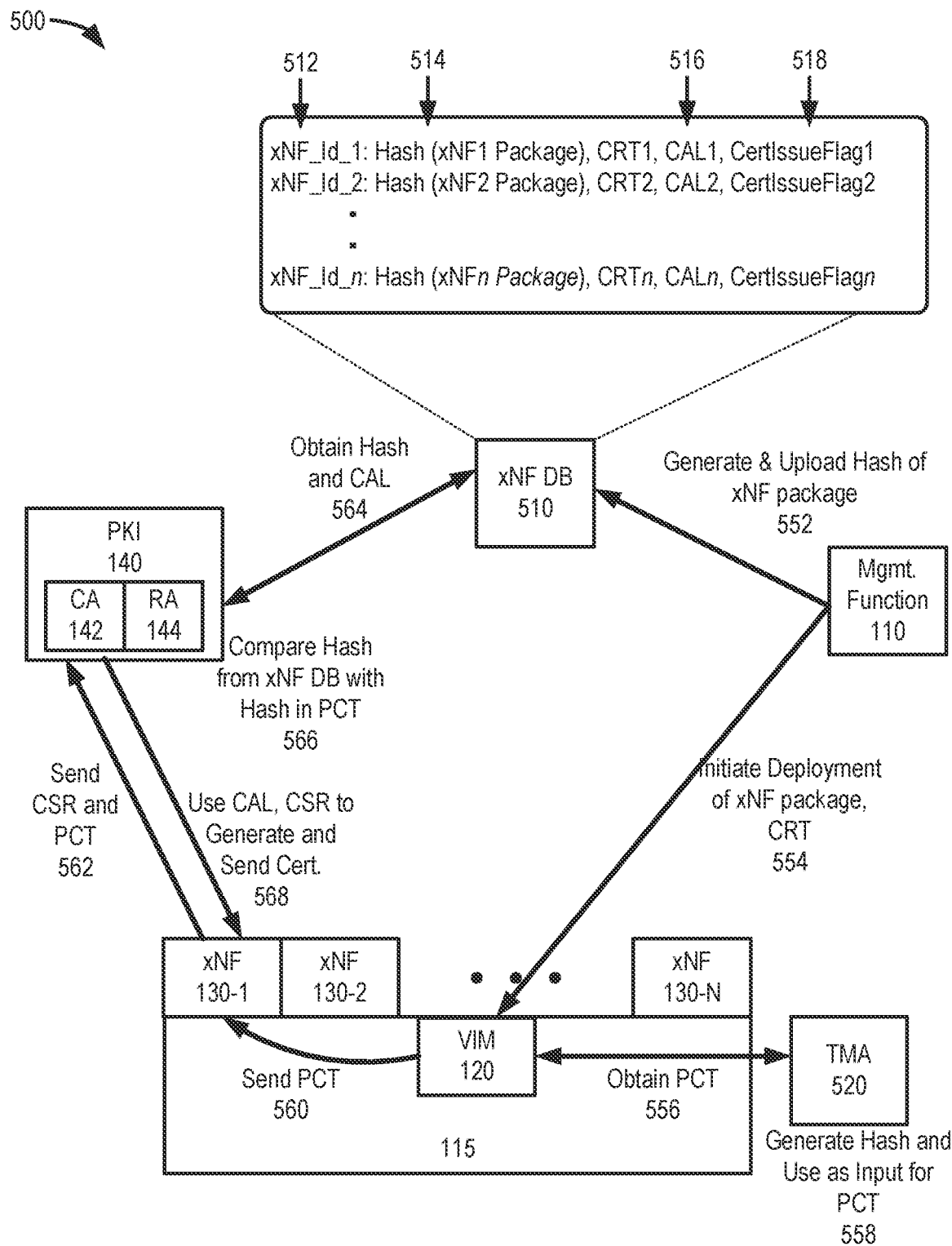
FIGS. 5 and 6 are diagrams illustrating processes for establishing dynamic trust credentials using a CRT and a Platform Characteristics Token (PCT).

FIG. 5 is a diagram illustrating communications for establishing dynamic trust credentials in a network environment 500. Communications in FIG. 5 employ a trusted attestation engine associated with the virtualized platform 115. FIG. 5 may provide simplified illustrations of communications in network environment 500 and are not intended to reflect every signal or communication exchanged between devices/functions.

As shown in FIG. 5, network environment 500 may include management function 110, virtualized platform 115 that includes VIM 120 and xNFs 130, PKI system 140 that includes CA 142 and RA 144, an xNF database 510, and a trusted measuring authority (TMA) 520. Management function 110, virtualized platform 115, and PKI system 140 may include features described above in connection with any of FIGS. 1-4.

XNF database 510 may include a data structure to store certificate policies, a CRT, and/or calculated hash values for xNFs software package 130, each of which may be provided by management function 110. As shown in FIG. 5, DB 510 may include, for each xNF 130, an xNF identifier 512, a hash value 514 of the xNF software package, a CAL 516, and a certificate issue flag 518. XNF identifier 512 may include a unique identifier for a VNF or CNF (e.g., "xNF_ID_1").

Hash value 514 may include a hash of the xNF software package (or image or xNF profile information, metadata) and the CRT for the xNF. CAL 516, if available, may include the attributes list for the particular xNF. According to one implementation, CAL 516 may be included as part of hash 514. Certificate issue flag 518 may include a flag to indicate whether a certificate (e.g., an X.509 certificate) has been issued for the xNF. The Certificate issue flag 518 is set to false initially.

TMA 520 may include a computer or network device which provides a trusted attestation engine associated with virtualized platform 115. TMA 520, may be realized using software, firmware or hardware and may use e.g. a trusted platform module (TPM), trusted execution environment (TEE), a secure environment (e.g. hardware security module) may provide "proof-of-image-integrity" (hashing the xNF package and digitally signing it using the private key associated with the TMA) by generating a Platform Characteristics Token (PCT) that includes a generation of the hash value of the xNF package or image. The PCT may be used by PKI system 140 to tailor an xNF digital certificate (e.g., an X.509 certificate) for a particular platform, such that the digital certificate may then only be used by xNF 130-1 when hosted on that platform (e.g., virtualized platform 115). An example of such a signed PCT generated by TMA 520 may include details on use of "side-car proxies" (e.g., when using service mesh) and availability of cryptographic suites within the proxy function. The PCT may also carry information on other characteristics (e.g. use of virtual machines, kata containers, version of the hypervisor, OS version numbers) associated with the platform.

In FIG. 5, upon receiving an xNF package, management function 110 may identify in virtualization platform 115 computing resources that can support the new xNF package and select a VIM (e.g., VIM 120) to deploy the new function. Management function 110 may generate and upload hash 552 of the xNF package to xNF database 510. Hash 552 may also include signed token for VIM 120 to use to verify deployment instructions and authenticity of the new xNF package. Hash 552 may also include a CRT and, optionally, a CAL within or separate from hash 552. Management function 110 may initiate deployment 554 of the xNF by sending the xNF package including the xNF profile and CRT to VIM 120.

VIM 120 may receive deployment instructions 554 and, using the xNF profile and CRT deployment instructions 554, retrieve a Platform Characteristics Token (PCT) from TMA 520, as indicated at reference 556. As shown at reference 558, TMA 520 may generate a hash based on the information in deployment instructions 554 and provide the hash value in the PCT. Thus, if VIM 120 provides legitimate information to TMA 520, the hash value in the PCT will match the hash value in xNF database 510.

As shown at reference 560, VIM 120 may instantiate the xNF onto the platform and provision the PCT with deployment instructions for the new xNF 130 (e.g., xNF 130-1). XNF-1 130 may generate a CSR and send the CSR and PCT to PKI system 140 (e.g., CA 142), as shown at reference 562. PKI system 140 may receive the CSR and PCT, and, in response, obtain 564 the hash and CAL for the corresponding xNF identifier from xNF database 510. PKI system 140 may compare 566 the hash from xNF database 510 with the hash from the PCT. Assuming that the hash values match PKI system 140 may use the CAL and CSR associated with xNF 130-1 to generate and send 568 a certificate (e.g., a X.509 certificate) to xNF 130-1. PKI system 140 may also update the certificate issue flag (field 518) in xNF database 510 to "true" (not shown).

In certain deployments, where a human operator is involved or if a management function is not available, an admin may be able to configure triggers in order that an xNF package is sent to the TMA 520 for generation of a PCT, a CRT, and/or a CAL using the manually configured parameters by a virtualized platform administrator.

Figure 6:
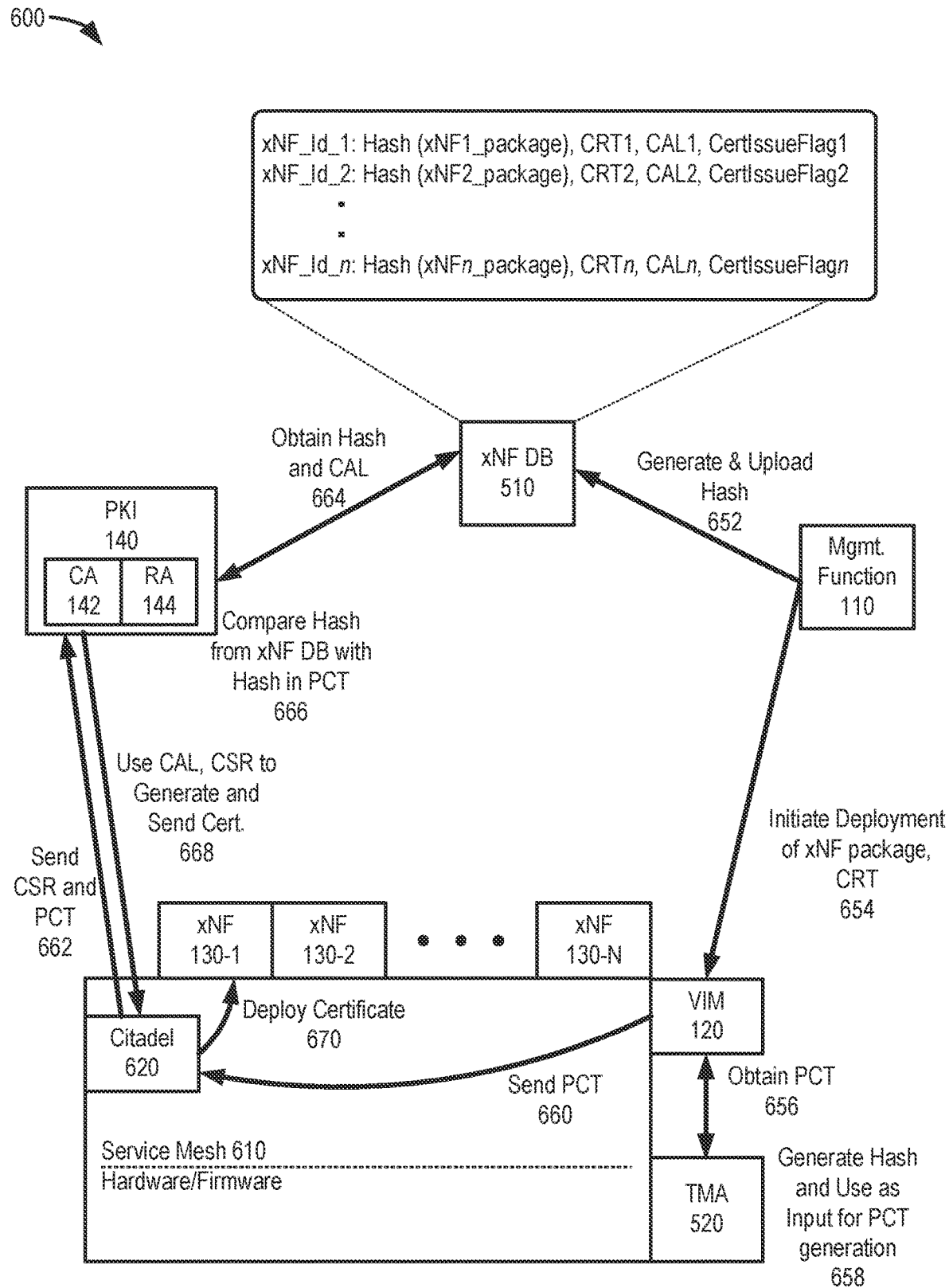

FIG. 6 is a diagram illustrating communications for establishing dynamic trust credentials in a network environment 600. Communications in FIG. 6 employ a trusted attestation engine associated with a service mesh 610, which is described below. FIG. 6 may provide simplified illustrations of communications in network environment 600 and are not intended to reflect every signal or communication exchanged between devices/functions.

As shown in FIG. 6, network environment 600 may include management function 110, PKI system 140 that includes CA 142 and RA 144, xNF database 510, TMA 520, and service mesh 610. Management function 110, PKI system 140, xNF database 510, and TMA 520 may include features described above in connection with any of FIGS. 1-5.

Service mesh 610 includes control plane and manages mutual TLS connections and security of user plane along with credential and certificate requisition process by a citadel 620. Service mesh 610 may functionally correspond to a portion of virtualized platform 115. Citadel 620 may include a network function or network device to manage a zero-trust environment for service mesh 610 and may assign certificates to each xNF 130. Citadel 620 may also accept external certificate authority keys as needed.

In FIG. 6, upon receiving an xNF package, management function 110 may identify a service mesh 610 that can support the new xNF package and select a VIM (e.g., VIM 120) to deploy the new xNF package. Management function 110 may generate and upload to xNF database 510 hash 652 of the xNF package. Hash 652 may optionally include a signed token for VIM 120 to use to verify deployment instructions and authenticity of the new xNF package. Hash 652 may also optionally include a CRT and, optionally, a CAL within or separate from hash 652. Management function 110 may initiate deployment 654 of the xNF by sending the xNF package, xNF profile and CRT to VIM 120.

VIM 120 may receive deployment instructions 654 and, using the xNF package, xNF profile and CRT deployment instructions 654, retrieve a PCT from TMA 520, as indicated at reference 656. As shown at reference 658, TMA 520 may generate a hash of the xNF package based on the information in deployment instructions 654 and provide the hash value in the PCT. Thus, if VIM 120 provides legitimate information to TMA 520, the hash value in the PCT will match the hash value in xNF database 510.

As shown at reference 660, VIM 120 may send the PCT with deployment instructions for the new xNF (e.g., xNF 130-1) to citadel 620. Citadel 620 or an Istio agent may generate a CSR and send the CSR and PCT to PKI system 140 (e.g., CA 142), as shown at reference 662. PKI system 140 may receive the CSR and PCT, and, in response, obtain 664 the hash and CAL for the corresponding xNF identifier from xNF database 510. PKI system 140 may compare 666 the hash from xNF database 510 with the hash from the PCT. Assuming that the hash values match PKI system 140 may use the CAL and CSR associated with xNF 130-1 to generate and send 668 a certificate (e.g., a X.509 certificate) to citadel 620. PKI system 140 may also update the certificate issue flag (field 518) in xNF database 510 to "true" (not shown). Citadel 620 may receive the certificate from PKI system 140 and deploy xNF 130-1 with the certificate.

The systems and methods described above leverage trust anchors to generate tokens which can then be used by network functions (xNFs). A virtualization infrastructure manager (VIM) for a virtualized platform receives an xNF software package and a certificate request token (CRT) from a management function. The xNF is a virtual NF or a containerized NF to be deployed on the virtualized platform. The CRT is digitally signed by the management function and includes a network address of a trust anchor platform and an xNF profile. The VIM deploys the xNF and provides the CRT to the xNF. The xNF obtains from the CRT the network address of the trust anchor platform, generates a certificate signing request (CSR) for a digital certificate, and submits the CSR and the CRT to the trust anchor platform. The xNF receives a digital certificate from the trust anchor platform based on validation of both the CSR and CRT.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, communications and encryption techniques described in connection with one of FIG. 3-9 may also be applicable to other Figures. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 3A-3C, 5 and 6, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   receiving, by a network function and from a virtualization infrastructure manager (VIM), a certificate request token (CRT) for the network function, wherein the CRT is digitally signed by a management function and includes:
   a network address of a trust anchor platform for the network function, and
   a Certificate Attribute List (CAL) with customization parameters for the network function;
   submitting, by the network function and to the trust anchor platform, a certificate signing request (CSR) and the CRT, wherein the CAL customization parameters supersede parameters in the CSR; and
   receiving, by the network function and based on validation of the CSR and CRT, a digital certificate from the trust anchor platform, wherein the digital certificate includes limitations consistent with the CAL customization parameters.

2. The method of claim 1, further comprising:
   obtaining, by the network function and from the CRT, the network address of the trust anchor platform; and
   generating, by the network function, the CSR to request the digital certificate.

3. The method of claim 1, wherein the network function is one of a virtual network function, a containerized network function, or another virtual entity to be deployed on a virtualized platform associated with the VIM.

4. The method of claim 1, further comprising:
   obtaining, by the management function, a software package for the network function;
   verifying, by the management function, authenticity of the software package;
   generating, by the management function, the CRT; and
   sending, by the management function and to the VIM, the software package and the CRT.

5. The method of claim 1, further comprising:
   binding, by the network function and prior to the submitting, the CRT to the CSR.

6. The method of claim 1, wherein the CRT further includes a profile for the network function and custom information particular to rights granted to the network function.

7. The method of claim 6, wherein the custom information includes one or more of:
   a type of request,
   a signature algorithm type,
   life-cycle management parameters, and
   a hash value based on the profile.

8. The method of claim 1, wherein the CAL customization parameters include a validity time period for the digital certificate.

9. The method of claim 1, further comprising:
   validating the CRT by the trust anchor platform; and
   generating the digital certificate by the trust anchor platform after validating the CRT.

10. A system, comprising:
    a first network device configured to execute a network function to:
    receive, from a virtualization infrastructure manager (VIM), a certificate request token (CRT) for the network function, wherein the CRT is digitally signed by a management function and includes: a network address of a trust anchor platform for the network function, and a Certificate Attribute List (CAL) with customization parameters for the network function;
    submit, to the trust anchor platform, a certificate signing request (CSR) and the CRT, wherein the CAL customization parameters supersede parameters in the CSR; and
    receive, based on validation of the CSR and CRT, a digital certificate from the trust anchor platform, wherein the digital certificate includes limitations consistent with the CAL customization parameters.

11. The system of claim 10, wherein the first network device is further configured to:
    obtain, from the CRT, the network address of the trust anchor platform; and
    generate the CSR to request the digital certificate for the network function.

12. The system of claim 10, wherein the network function is one of a virtual network function, a containerized network function, or another virtual entity to be deployed on a virtualized platform associated with the VIM.

13. The system of claim 10, further comprising:
a second network device configured to:
obtain a software package for the network function;
verify authenticity of the software package;
generate the CRT; and
send, to the VIM, the software package and the CRT.

14. The system of claim 10, wherein the first network device is further configured to:
bind the CRT to the CSR prior to submitting the CSR.

15. The system of claim 10, wherein the CAL customization parameters include a validity time period for the digital certificate.

16. The system of claim 10, further comprising:
the trust anchor platform configured to:
validate the both the CSR and the CRT; and
generate the digital certificate after successfully validating the CSR and the CRT.

17. The system of claim 16, wherein the trust anchor platform includes a public key infrastructure system.

18. A non-transitory computer-readable medium containing instructions executable by at least one processor, the non-transitory computer-readable medium comprising one or more instructions for a network function to:
receive, from a virtualization infrastructure manager (VIM), a certificate request token (CRT) for the network function, wherein the CRT is digitally signed by a management function and includes: a network address of a trust anchor platform for the network function, and a Certificate Attribute List (CAL) with customization parameters for the network function;
submit, to the trust anchor platform, a certificate signing request (CSR) and the CRT, wherein the CAL customization parameters supersede parameters in the CSR; and
receive, based on validation of the CSR and CRT, a digital certificate from the trust anchor platform, wherein the digital certificate includes limitations consistent with the CAL customization parameters.

19. The non-transitory computer-readable medium of claim 18, wherein the one or more instructions for submitting the CSR and the CRT comprise instructions for:
binding the CRT to the CSR.

20. The non-transitory computer-readable medium of claim 18, wherein the CRT further includes a profile for the network function and custom information particular to rights granted to the network function, the custom information including one or more of:
life-cycle management parameters, and
a hash value based on the profile.

* * * * *